United States Patent
de Gans Li et al.

(10) Patent No.: US 12,091,783 B2
(45) Date of Patent: Sep. 17, 2024

(54) STRETCHED AROMATIC POLYETHERS

(71) Applicant: Evonik Operations GmbH, Essen (DE)

(72) Inventors: Lan de Gans Li, Mülheim an der Ruhr (DE); Martin Wielpütz, Senden (DE); Markus Hartmann, Sendenhorst (DE); Dirk Heinrich Bücker, Ratingen (DE)

(73) Assignee: Evonik Operations GmbH, Essen (DE)

( * ) Notice: Subject to any disclaimer, the term of this patent is extended or adjusted under 35 U.S.C. 154(b) by 552 days.

(21) Appl. No.: 17/284,151

(22) PCT Filed: Oct. 17, 2019

(86) PCT No.: PCT/EP2019/078159
§ 371 (c)(1),
(2) Date: Apr. 9, 2021

(87) PCT Pub. No.: WO2020/079121
PCT Pub. Date: Apr. 23, 2020

(65) Prior Publication Data
US 2021/0332507 A1    Oct. 28, 2021

(30) Foreign Application Priority Data
Oct. 17, 2018   (EP) .................................. 18200966

(51) Int. Cl.
*D02J 1/22*     (2006.01)
*C08G 65/40*    (2006.01)
*D01D 10/02*    (2006.01)
*D01F 6/66*     (2006.01)

(52) U.S. Cl.
CPC .......... *D02J 1/224* (2013.01); *C08G 65/4012* (2013.01); *D01D 10/02* (2013.01); *D01F 6/665* (2013.01)

(58) Field of Classification Search
CPC ...... D02J 1/224; C08G 65/4012; D01F 6/665; D01D 5/098
See application file for complete search history.

(56) References Cited

U.S. PATENT DOCUMENTS 3,869,430 A     3/1975  Blades
5,149,581 A  *  9/1992  Matsuo .................. B32B 27/04
                                              524/847

2011/0027492 A1  11/2011  Hartmann et al.
2012/0019931 A1   8/2012  Hartmann et al.
2012/0023253 A1   9/2012  Goering et al.
2020/0024884 A1   1/2020  Inskeep
2021/0381135 A1  12/2021  De Gans Li et al.

FOREIGN PATENT DOCUMENTS

| JP | 01127511 A | * | 5/1989 | |
| JP | H04 343710 | | 11/1992 | |
| JP | 2001279522 A | | 10/2001 | |
| WO | 2004/028803 A1 | | 4/2004 | |
| WO | WO-2008039650 A2 | * | 4/2008 | ............ B29C 70/20 |
| WO | 2010/057982 A1 | | 5/2010 | |
| WO | 2013/190149 A1 | | 12/2013 | |
| WO | 2020/074572 | | 4/2020 | |

OTHER PUBLICATIONS

Brünig et al., "Melt spinning of fine and ultra-fine PEEK-filaments," Journal of Materials Science, vol. 38, Copyright 2003, pp. 2149-2153.
German language International Search Report mailed on Dec. 20, 2019 in PCT/EP2019/078159 (3 pages).
International Search Report mailed on Dec. 20, 2019 in PCT/EP2019/078159 (2 pages).
Written Opinion mailed on Dec. 20, 2019 in PCT/EP2019/078159 (5 pages).
Chinese journal article "Effects of tension heat-set process on structures and properties of MWCNTs/PEEK composite fibers, Jin Yanmei, Acta Materiae Compositae Sinica", vol. 29, No. 3, pp. 23-29, published Jun. 2012 (18 pages).
R. Indu Shekar et al. "Properties of high modulus PEEK yarns for aerospace applications", Journal of Applied Polymer Science, US, vol. 112, No. 4, May 15, 2009 (May 15, 2009), pp. 2497-2510 (14 pages).
Fakirov et al., "On the Glass Transition Temperature of Polyethylene as Revealed by Microhardness Measurements", Journal of Macromolecular Science Part B, Physics, vol. 39, No. 2, 2000, pp. 297-301.
De Gans Li, U.S. Appl. No. 17/281,927, filed Mar. 31, 2021.

* cited by examiner

*Primary Examiner* — Elizabeth M Imani
(74) *Attorney, Agent, or Firm* — Grüneberg and Myers PLLC

(57) ABSTRACT

Stretched filaments based on aromatic polyethers, wherein the filaments have been stretched at a temperature between glass transition temperature and melting point and wherein the filaments are cooled down to below the glass transition temperature under full tensile load and a process for production thereof and use thereof.

18 Claims, No Drawings

STRETCHED AROMATIC POLYETHERS

CROSS REFERENCE TO RELATED APPLICATIONS

This application is a 35 U.S.C. § 371 U.S. national phase entry of International Application No. PCT/EP2019/078159 having an international filing date of Oct. 17, 2019, which claims the benefit of European Application No. 18200966.2 filed Oct. 17, 2018, both of which are incorporated herein by reference in its entirety.

FIELD

The present invention is directed to stretched filaments based on aromatic polyethers, wherein the filaments had been stretched at a temperature between glass transition temperature and melting point, and wherein the filaments are cooled down to room temperature under full tensile load.

BACKGROUND

Fiber-reinforced materials are usually based on the use of glass fibers or carbon fibers in polymers. This means that there is the fundamental problem of the compatibility of the fibers with the matrix material and hence binding problems between reinforcing material and matrix. This is frequently a particular problem when thermoplastics are used as matrix. Moreover, these materials are not recyclable since it is very difficult to separate the fibers out.

The prior art discloses predominantly two methods of stretching polyolefins, such as polyethylene or polypropylene, the melt spinning method (WO 2004/028803 A1) and the gel spinning method (WO 2010/057982 A1). Polyolefins can simply be stretched at room temperature, it being necessary to select a relatively low stretching speed owing to the exothermicity of stretching. The stretched polyolefins have the disadvantage that they shrink very significantly after stretching when processed at elevated temperatures and therefore first have to be equilibrated at the desired working temperature. Moreover, stretched polyolefins have very limited mechanical values that limit their usability as reinforcing fibers. Particularly the lack of thermal stability and lack of compressive stress (cold formability) are disadvantageous.

Brüning et al. (J Mat Sci 38 (2003) 2149-53) report ultrathin PEEK filaments by means of melt spinning methods by increasing the takeoff rate with simultaneous reduction in the mass throughput per spinneret.

Shekar et al. (Journal of Applied Polymer Science, vol. 112, no. 4, pages 2497-2510) disclose stretched PEEK filaments. However, PEEK filaments of this kind have inadequate mechanical properties (see Example 4).

WO 2013/190149 A1 discloses ductile fibers of various thermoplastics, preferably polypropylene and polyethylene, as a constituent of what are called prepregs. These are understood to mean weaves of thermoplastic fibers with brittle fibers, in particular carbon fibers. These materials are then preferably thermoformed or compressed in a matrix of the material of the ductile fibers. This melts the ductile fibers and leads to an improvement in the binding between matrix and brittle fiber.

The production of fully aromatic polyamide fibers, such as poly(p-phenyleneterephthalamide) (PPTA, aramid under the following brand names: Kevlar® (trademark of DuPont, USA), Twaron® (trademark of Teijin Lim, Japan)), is described in U.S. Pat. No. 3,869,430 A.

SUMMARY

The term "filament" in the context of this invention is understood to mean fibers, films or ribbons. Films in particular are preferably stretched in more than one direction.

The term "stretching" is understood to mean a drawing process which is conducted on conclusion of extrusion by application of thermal and mechanical energy.

The problem addressed by the present invention was therefore, that of producing stretched filaments from aromatic thermoplastics, and of providing a non-hazardous, simple and solvent-free method of stretching aromatic thermoplastics.

The problem was solved by stretched filaments of aromatic polyethers, wherein the filaments are cooled down under full tensile load after the stretching.

DETAILED DESCRIPTION

The present invention provides stretched filaments containing at least 80% by weight of, preferably 85% by weight of, more preferably 90% by weight of, even more preferably 95% by weight of, and especially consisting of aromatic polyethers,
wherein the filaments have been stretched at a temperature between glass transition temperature and melting point and
wherein the filaments have been cooled down to below the glass transition temperature under full tensile load.

In the context of the invention, the temperature between glass transition temperature and melting point at which the filaments have been stretched is also called "stretching temperature". This temperature is maintained in a manner known to the person skilled in the art during the stretching operation.

The invention further provides a process for producing the stretched filaments according to the invention.

The invention further provides for the use of the stretched filaments according to the invention for production of composites.

The invention further provides for the use of the stretched filaments according to the invention for production of winding layers.

One advantage of the stretched filaments according to the invention is that they undergo little shrinkage at elevated temperature, i.e. have barely any relaxation effect.

It is also advantageous that the stretched filaments according to the invention have high mechanical stability. The mechanical stability is preferably measured in the form of a breaking stress in the direction of stretching.

It is also advantageous that the stretched filaments according to the invention have high mechanical stability, even at elevated temperature.

The stretched filaments according to the invention surprisingly show the advantages set out above over the prior art. In spite of numerous analytical endeavors, the inventors were unable to find any parameter that gives a physical explanation for these improvements.

The stretched filaments according to the invention, the composites according to the invention comprising the filaments according to the invention, and the production and use according to the invention are described by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. Where documents are cited within the context of the present description, the entire content thereof is intended to be part of the disclosure of the present invention. Where percentage figures are given hereinafter, unless stated otherwise, these are figures in % by weight. In the case of compositions, the percentage figures are based on the entire composition unless otherwise stated. Where average values are given hereinafter, unless stated otherwise, these are mass averages (weight averages). Where measured values are given hereinafter, unless stated otherwise, these measured values were determined at a pressure of 1013.25 hPa and at a temperature of 25° C. Melting temperatures and glass transition temperatures are determined by means of DSC to EN ISO 11357-1:2016D. Glass transition temperature is occasionally also referred to as glass temperature in the art.

The technical details and embodiments set out in relation to one aspect of the present invention are also applicable to the other aspects, if not explicitly ruled out and technically possible. For example, the embodiments and preferred parameters of the stretched filaments according to the invention are also applicable mutatis mutandis to the process according to the invention and vice versa.

The scope of protection includes finished and packaged forms of the products according to the invention that are customary in commerce, both as such and in any forms of reduced size, to the extent that these are not defined in the claims.

According to the invention, the filaments are stretched at a temperature between glass transition temperature and melting point and then cooled down to a temperature below the glass transition temperature under full load.

The aromatic polyethers are preferably selected from polyetheretherketone (PEEK), polyetherketone (PEK), polyetherketonetherketoneketone (PEKEKK), polyetherketoneketone (PEKK), polysulfone (PSU), polyethersulfone (PES), polyarylsulfone (PAS), and mixtures and copolymers thereof. More preferred aromatic polyethers are polyetheretherketone (PEEK), polyetherketone (PEK), polyetherketonetherketoneketone (PEKEKK), polyetherketoneketone (PEKK).

The aromatic polyethers preferably do not contain any solvents.

The filaments according to the invention have preferably been stretched by a stretching factor SF of not less than 5, more preferably SF not less than 10, or greater. Stretching factor in the context of the invention is understood to mean a factor by which the length of a filament has increased after stretching. For example, a starting filament of length 1 m, after stretching to 10 m, would have been stretched by a stretching factor of 10.

The filaments according to the invention have preferably been stretched in free space without contact. The zone in which the stretching takes place is a zone in which the atmosphere of the environment is heated, i.e., for example, a type of tubular furnace or the space between two heated plates.

The filaments according to the invention can be stretched continuously or batchwise.

Preference is given to static stretching, i.e. stretching operations in which one end of the filament remains at rest, with speeds of 10 mm/min up to 200 mm/min, preferably of 20 mm/min up to 100 mm/min, more preferably 30 mm/min to 80 mm/min.

Preferred continuous stretching operations are conducted in such a way that the low transport rate is preferably in the range from 5 mm/min up to 20 000 mm/min, more preferably from 10 mm/min up to 3000 mm/min, still more preferably from 50 mm/min up to 2500 mm/min, still more preferably 100 mm/min to 2000 mm/min, even more preferably 500 mm/min to 1500 mm/min. The stretching factors are used to calculate the speed of the faster-running transport unit. For example, transport speeds can be adjusted by adjusting the running speeds of at least one roll or spool in each case at the start and at the end of the filament to be stretched.

The filaments according to the invention can be stretched by just one stretching operation or by several in succession. In the latter case, the stretching temperature chosen has to be higher. Just one stretching operation is more preferred.

The filaments according to the invention are preferably cooled down to below 130° C., more preferably below 120° C., even more preferably below 110° C., particularly preferably below 100° C., more particularly preferably below 90° C. and in particular below 80° C. after the stretching operation.

The filaments according to the invention are cooled down to a temperature below the glass transition temperature after the stretching operation. This cooling is preferably effected gradually, preferably for at least 10 seconds, more preferably at least 20 seconds, even more preferably at least 30 seconds, more preferably at least 45 seconds, especially preferably at least 1 minute.

The filaments according to the invention are cooled down under full tensile load. In the context of the invention, this means that at least 80% of the force during stretching also continues to act on the filament during the cooling. The force is preferably 90%, more preferably 95%; even more preferably, the force is virtually the same as during the stretching. Ideally, the force is the same.

The stretched filaments according to the invention preferably have only minor shrinkage/relaxation in the direction of tension when heated to a temperature below the melting point.

Preferably, the relaxation temperature is above the glass transition temperature and below the melting temperature, preferably below the stretching temperature.

Preferably, the filaments according to the invention relax by a maximum of 6% in relation to the stretched length, preferably by a maximum of 5.5%, more preferably by a maximum of 5%, even more preferably by a maximum of 4.5% and especially preferably by a maximum of 4%.

Preferably, the relaxation of the filaments according to the invention is not effected under tensile stress.

The stretched filaments according to the invention preferably have a length greater than 5 times a dimension at right angles to the length; the filaments are preferably what are called endless filaments. The length of the filaments is always determined in the direction of tension.

The term "filament" in the context of this invention is understood to mean fibers, films or ribbons. Films in particular are preferably stretched in more than one direction.

Preferred filaments are ribbons. Preference is given to ribbons having a ratio of their width to their thickness of 7 to 150, preferably 8 to 100.

The individual filaments can be worked to form composites; thus, prefer composites of fibers are fiber bundles and yarns, where the fiber bundles or yarns can be processed to give further composites, preferably to give uni- or multidirectional scrims, weaves such as mats and knits, or else mixed forms.

Scrims may consist either of filaments cut to a particular length or of endless filaments in the form of windings around tubes, for example.

Preferred scrims composed of endless filaments are winding layers around hollow bodies; in this case, the filaments are preferably ribbons. Preferably, the winding layers are unidirectional or multidirectional, more preferably unidirectional. Multidirectional winding layers have an angle in relation to the direction of tension of the filaments. This angle is preferably in the range from 5° to 120°, more preferably from 30° to 90°, especially preferably 15° to 80°. In the case of winding layers around tubes, these winding wires have a slope angle in relation to the centre of the tube. Preferably, different winding layers have different slope angles. Preferably, the winding layers around tubes are designed in relation to the slope angle such that, after a rotation, the edges of the layer conclude flush with one another.

In a further aspect, the present invention relates to a process for producing the filaments stretched in accordance with the invention.

The present invention also relates to a process for producing stretched filaments containing at least 80% by weight of aromatic polyethers, especially the filaments stretched in accordance with the invention, characterized in that the filaments are stretched at a temperature between glass transition temperature and melting point and are then cooled down to below the glass transition temperature under full load.

Some examples are particularly preferred parameters of the process according to the invention are set out hereinafter. For example, as described above, the stretching factor is preferably greater than or equal to 5, more preferably greater than or equal to 10. The stretching preferably proceeds in a static manner.

The cooling also preferably takes at least 10 seconds, preferably at least 20 seconds, more preferably at least 30 seconds, particularly preferably at least 45 seconds, especially preferably at least 1 minute.

Preferably, the filaments, after the stretching, are cooled down to below 130° C., preferably below 120° C., more preferably below 110° C., particularly preferably below 100° C., more particularly preferably below 90° C. and especially below 80° C.

The process according to the invention preferably comprises just one stretching operation.

The process according to the invention advantageously allows production of stretched filaments which, when heated to a temperature below the melting point, have only minor shrinkage/relaxation in tension direction, preferably not more than 6% in relation to the stretched length.

Advantageously, the filaments according to the invention are notable for higher stretching which is not achievable by the processes in the prior art. Instead, the filaments from the prior art are subject to unwanted shrinkage after stretching, especially after relaxation, associated with a loss of mechanical properties. Advantageously, the process according to the invention therefore allows the provision of stretched filaments without or with considerably lower unwanted shrinkage, for example at elevated temperatures, by comparison with the known prior art processes.

In a further aspect, the present invention relates to a tube comprising a wound ply comprising at least one stretched filament according to the invention. These tubes are notable for exceptional stability.

EXAMPLES

Materials

PEEK: VESTAKEEP® 5000G, trademark of Evonik

The measurement of the melting temperature and glass transition temperature was performed using a Perkin Elmer Diamond instrument with automatic peak recognition and integration, in accordance with DIN EN ISO 11357-1: 2016D at a heating rate of 20 K/min.

Example 1, Production of the Specimens

One specimen was produced in each case by extruding PEEK by means of an extruder (Collin E45M) at a temperature of 390° C. and calendering to give a ribbon having a thickness of 650 μm and width 23 mm, and cooling to 130° C.

The takeoff speed was 1.4 m/min.

Example 2, Static or Continuous Stretching of the Specimens

Method 1 (Static Stretching)

In a tensile tester (Zwick, Z101-K), specimens according to Example 1 were stretched at a speed of 10 mm/min at 200° C. Before the tensile stress was released, the stretched specimens were cooled down to room temperature. This gave stretched filaments according to the invention.

Method 2 (Continuous Stretching)

Endless specimens according to Example 1 were provided on spools. Each specimen was stretched on a continuous machine (Retech Drawing) at a material feed rate of 4 rpm, corresponding to a transport speed of 1000 mm/min, and a tension rate of up to 32 rpm, corresponding to a transport speed of 8000 mm/min, to a stretching factor (SF) of up to 8. For lower stretch factors, the tension rate was adjusted accordingly. The stretching took place at a temperature of 200° C. Before the tension was released, the stretched specimens were cooled down to room temperature. This gave stretched filaments according to the invention.

Example 3, Mechanical Tests by Tensile Tests

Dumbbell specimens according to DIN 527-5:1997 (A specimen) were punched out of the stretched filaments obtained by Methods 1 and 2. The thickness was the result of the respective stretching experiment and was not altered.

The tensile strength was measured by means of a Zwick tensile tester at 23° C. and at a testing speed of 5 mm/min, a clamped length of 120 mm and a measurement length of the increment gauge of 75 mm. The relative humidity was 50%.

The results are reported in Tables 1 to 3. Each result is the arithmetic average from the tensile tests on 3 dumbbell specimens each made from a stretched filament.

In tables 1 to 3, "Max strength" denotes the maximum force before fracture or tearing of the dumbbell specimens (effectively breaking strength).

TABLE 1

T = 23° C., results from the tensile test according to Example 3 (static stretching).

|  | E 1.0* | E 1.1 | E 1.2 | E. 1.3 |
|---|---|---|---|---|
| Stretching factor | 1 | 1.3 | 2.3 | 3.58 |
| Elastic modulus [MPa] | 2863 | 4564 | 6215 | 8328 |
| max strength, $\sigma_m$ [MPa] | 88.35 | 217.9 | 322.8 | 461.3 |

*unstretched sample

TABLE 2

T = 23° C., results of the tensile tests according to example 3 (continuous stretching).

|  | E 2.0* | E 2.1 | E 2.2 | E 2.3 |
|---|---|---|---|---|
| Stretching factor | 1 | 2 | 3 | 8 |
| Modulus of elasticity [MPa] | 2200 | 3800 | 5000 | 6670 |
| Max strength, $\sigma_m$ [MPa] | 90 | 182 | 288 | 394 |

*unstretched sample

Example 4 (Comparative Example)

Analogously to Example 2, Method 2, specimens obtained according to Example 1 were stretched at a material feed rate of 4 rpm at 200° C. As described above, the tension rate was matched to the desired stretching factor.

Unlike in Example 2, the stretched specimens were cooled down immediately without tensile load.

TABLE 3

T = 23° C., results of the tensile test according to Example 4.

|  | V 1.0* | V 1.1 | V 1.2 |
|---|---|---|---|
| Stretching factor | 1 | 2 | 3 |
| Modulus of elasticity [MPa] | 2200 | 1960 | 3630 |
| Max strength, $\sigma_m$ [MPa] | 90 | 111 | 182 |

*unstretched sample

As described in Example 3, dumbbell specimens were punched and their mechanical properties were determined by tensile tests.

The stretching and cooling under tensile load achieved distinct improvement in the mechanical properties of the filaments according to the invention. By contrast, the mechanical properties of the filaments produced in a non-inventive manner (Table 3) were much poorer than the corresponding filaments according to the invention with equal or comparable stretching (Tables 1 and 2). The modulus of elasticity of the stretched filaments from the working example, for example in the case of stretching by a factor of 2, was actually poorer than that of the unstretched comparative sample. The improvement at higher stretching factors was also much less marked than in the case of comparable filaments according to the invention.

A particularly disadvantageous feature noted by the inventors was that the filaments produced in a noninventive manner according to Example 4 had high shrinkage after cooling. As a result, it was not possible to achieve reproducible mechanical properties. This is a further disadvantage of the prior art filaments compared to those according to the invention.

Moreover, the experiments showed that static stretching achieved distinctly better mechanical properties than continuous stretching.

The invention claimed is:

1. A stretched filament having a stretch factor greater than or equal to 5, comprising at least 80% by weight of aromatic polyethers,
    wherein the filament has been stretched at a temperature between glass transition temperature and melting point and wherein the filament has been cooled down to below the glass transition temperature under full load,
    wherein the aromatic polyethers consists of polyetheretherketone (PEEK).

2. The stretched filament according to claim 1, wherein the melting temperatures and glass transition temperatures are determined by means of DSC to EN ISO 11357-1:2016D.

3. The stretched filament according to claim 1, wherein the stretched filaments comprise at least 85% by weight of aromatic polyethers.

4. The stretched filament according to claim 1, wherein the filaments are fibers or ribbons.

5. The stretched filament according to claim 4, wherein the filaments are ribbons.

6. A process for producing stretched filament according to claim 1, wherein the filaments are stretched at a temperature between glass transition temperature and melting point and are then cooled down to below the glass transition temperature under full load.

7. The process according to claim 6, wherein the melting temperatures and glass transition temperatures are determined by means of DSC to EN ISO 11357-1:2016D.

8. The process according to claim 6, wherein the stretching proceeds in a static manner.

9. The process according to claim 6, wherein the cooling takes at least 10 seconds.

10. The process according to claim 6, wherein the filaments, after the stretching, are cooled down to below 130° C.

11. The process according to claim 6, wherein just one stretching operation is performed.

12. A composite comprising the stretched filament according to claim 1.

13. A wound ply comprising at least one stretched filament according to claim 1.

14. A tube comprising at least one wound ply comprising at least one stretched filament according to claim 1.

15. The stretched filament according to claim 1, wherein the stretched filaments comprise at least 90% by weight of aromatic polyethers.

16. The stretched filament according to claim 1, wherein the stretched filaments consist of polyetheretherketone (PEEK).

17. The stretched filament according to claim 1, wherein the stretching factor is greater than or equal to 10.

18. The stretched filament according to claim 1, wherein the filament relaxes by a maximum of 6% in relation to the stretched length.

* * * * *